US009195904B1

(12) United States Patent
Liu et al.

(10) Patent No.: US 9,195,904 B1
(45) Date of Patent: Nov. 24, 2015

(54) METHOD FOR DETECTING OBJECTS IN STEREO IMAGES (71) Applicant: Mitsubishi Electric Research Laboratories, Inc., Cambridge, MA (US)

(72) Inventors: Ming-Yu Liu, Cambridge, MA (US); Oncel Tuzel, Winchester, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 14/272,570

(22) Filed: May 8, 2014

(51) Int. Cl.
 *G06K 9/00* (2006.01)
 *G06K 9/48* (2006.01)
 *G06K 9/46* (2006.01)
 *G06K 9/62* (2006.01)
 *G06K 9/52* (2006.01)
 *G06T 17/00* (2006.01)

(52) U.S. Cl.
 CPC *G06K 9/468* (2013.01); *G06K 9/52* (2013.01); *G06K 9/6256* (2013.01); *G06K 9/6267* (2013.01); *G06T 17/00* (2013.01)

(58) Field of Classification Search
 USPC .................................................. 382/154, 197
 See application file for complete search history.

(56) References Cited

U.S. PATENT DOCUMENTS

2012/0008857 A1* 1/2012 Choi .............................. 382/154
2013/0177237 A1 7/2013 Schamp et al.

OTHER PUBLICATIONS

Jiao et al, "Cost volume filtering based stereo matchign with imporved matchign cost and secondary refinement", Multimedia and Expo (ICME), 2014 IEEE conference, pp. 1-6.*
Hosni et al, "Fast Cost-Volume Filtering for Visual Correspondence and Beyond", Pattern Analysis and Machine Intellignence, IEEE, 2013, pp. 504-511.*
Hiroshi Hattori, Akihito Seki, Manabu Nishiyama, and Tomoki Watanabe Stereo-based Pedestrian Detection using Multiple Patterns In Proc. British Machine Vision Conference (BMVC), Sep. 2009.
Christoph G. Keller, Markus Enzweiler, Marcus Rohrbach, David Fernadez Llorca, Christoph Schnorr, and Dariu M. Gavrila The Benefits of Dense Stereo for Pedestrian Detection IEEE Transaction on Pattern Analysis and Machine Intelligence, 12(4):1096-1106, Dec. 2011.
Rodrigo Benenson, Markus Mathias, Radu Timofte and Luc Van Gool Pedestrian detection at 100 frames per second in IEEE Conference on Computer Vision and Pattern Recognition 2012, Jun. 2012.

* cited by examiner

*Primary Examiner* — Kathleen Y Dulaney
(74) *Attorney, Agent, or Firm* — Dirk Brinkman; Gene Vinokur (57) ABSTRACT

A method detects an object in a pair of stereo images acquired of a scene, by first generating a cost volume from the pair of stereo images, wherein the cost volume includes matching costs for a range of disparity values, for each pixel the stereo images, between the stereo images in the pair. Feature vectors are determined from sub-images in the cost volume using a feature function of the disparity values with a minimal accumulated cost within regions inside the sub-images. Then, a classifier is appled to the feature vectors to detect whether the sub-image includes the object.

10 Claims, 7 Drawing Sheets

METHOD FOR DETECTING OBJECTS IN STEREO IMAGES

FIELD OF THE INVENTION

This invention relates to computer vision, and more particularly to detecting objects in stereo images.

BACKGROUND OF THE INVENTION

Many computer vision applications use stereo images acquired by a stereo camera to detect objects. A stereo camera typically has multiple lenses and sensors. Usually, the intra-axial distance between the lenses is about the same distance as between the eyes to provide overlapping views.

Figure 1:
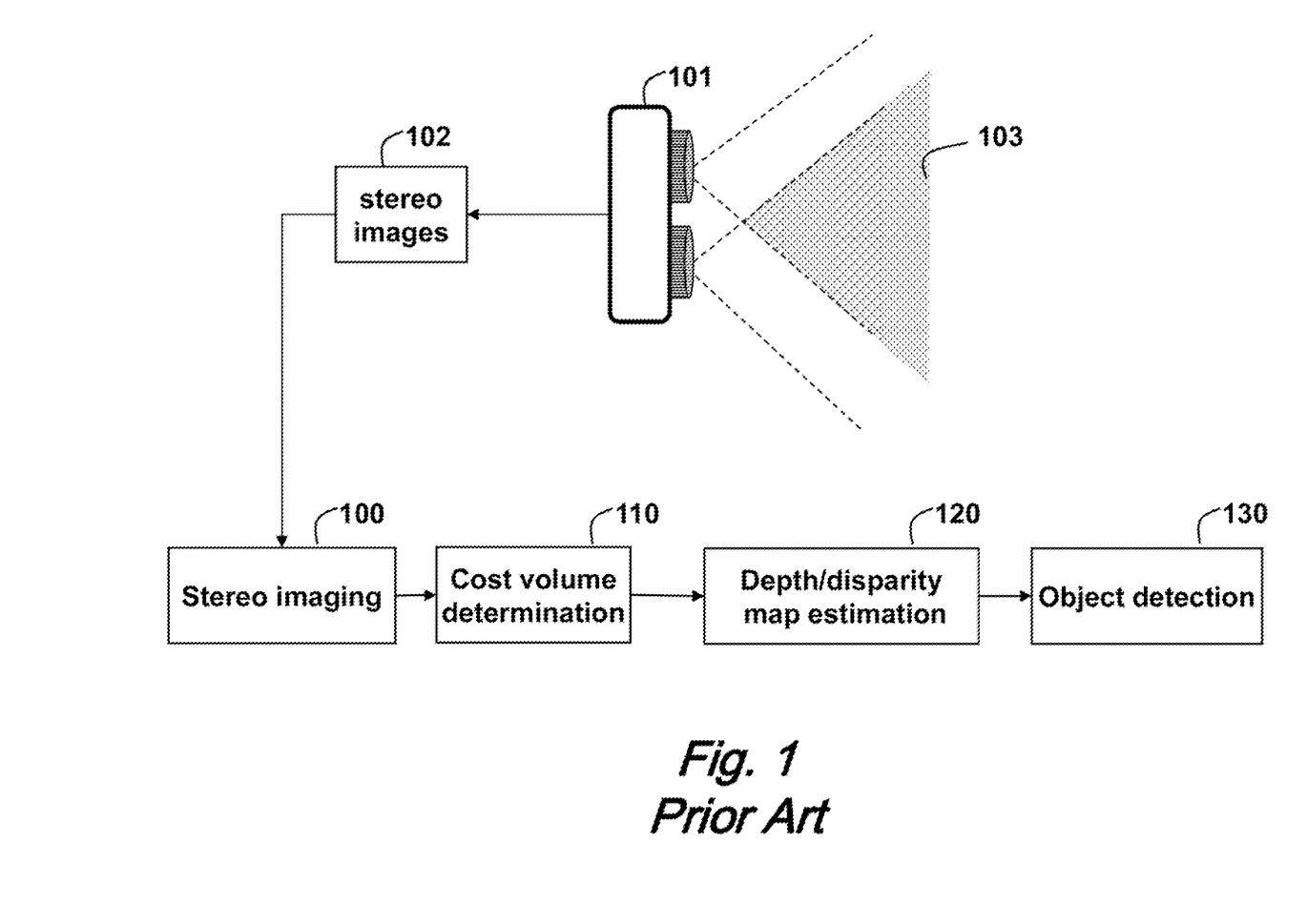
FIG. 1 is a block diagram of a conventional stereo-based object detection system.

FIG. 1 shows a conventional system for stereo-based object detection. A stereo camera 101 acquires stereo images 102. The detection method can include the following steps: stereo imaging 100, cost volume determination 110, depth/disparity map estimation 120, and object detection 130.

Most of the conventional methods for stereo-based object detection rely on per pixel depth information in the overlapping area 120. This step is generally referred as depth/range map estimation. This step can be achieved by determining disparity values, i.e., translation of corresponding pixels in the two images, determining the depth map. The depth map can then be used for object detection 130, e.g., a histogram of oriented gradients (HoG) of the depth map is used for object description. One method estimates the dominate disparity in a sub-image region, and uses a co-occurrence histogram of the relative disparity values for object detection.

Depth/range/disparity map estimation is a challenging problem. Local methods suffers from inaccurate depth determination, while global methods require significant computational resources, and are unsuited for real-time applications.

Several methods avoid the depth map determination step by using stereo cues for region of interest generation. For example, one method determines a stixel map which marks the potential object locations. Each stixel is defined by a 3D position relative to the camera and stands vertically on a ground plane. A detector based on the color image content is then applied to the locations to detect objects.

U.S. Publication 20130177237 uses a range map to determine an area of interest, and uses a classifier based on an intensity histogram to detect objects.

Region of interest methods cannot be directly applied to object detection. They have to be applied in conjunction with other object detectors. In addition, miss detection is certain when the area of interest does not cover the object.

SUMMARY OF THE INVENTION

The embodiments of the invention provide a method for detecting objects in stereo images. A cost volume is computed from the images. Then, object detection is directly applied features obtained from the cost volume. The detection uses T decision tree classifiers (Adaboost) that are learned from training features.

The invention avoids the error-prone and computationally-complex depth map estimation step of the prior art, and leads to an accurate and efficient object detector. The method is better-suited for embedded systems because it does not require complex optimization modules necessary to obtain good depth map. In addition, the method searches all sub-images in the input images to detect the object. This avoids the miss detection problem that exists in the region of interest generation techniques.

The detection is accurate because the method can leverage a large amount of training data and make use of machine learning procedures. It outperforms region of interest generation techniques in detection accuracy.

DETAILED DESCRIPTION OF THE PREFERRED EMBODIMENTS

Figure 2:
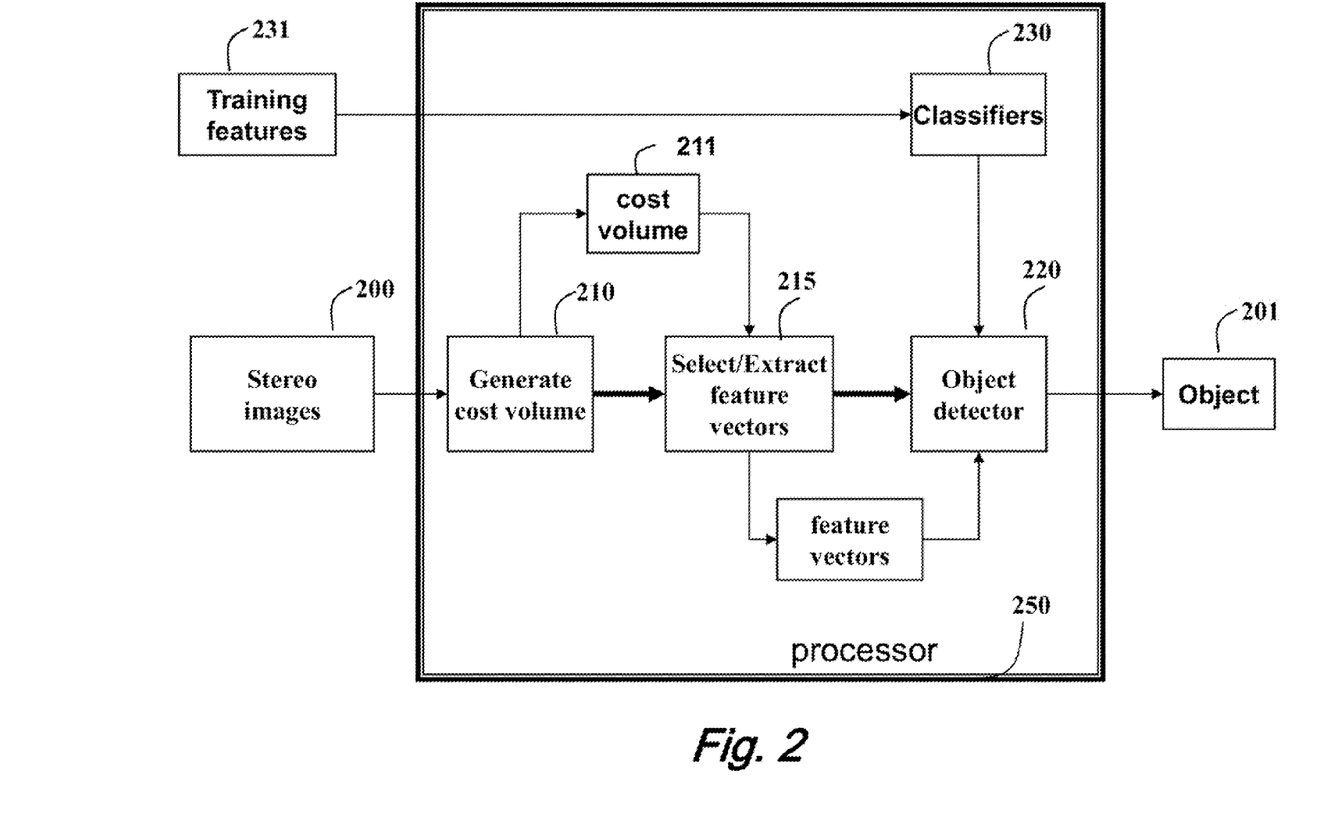
FIG. 2 is a block diagram of a stereo-based object detection system according to embodiments of the invention.

FIG. 2 shows a method and system for detecting an object 201 in a pair of stereo images 200 according to embodiments of our invention. A cost volume 211 is generated 210 from the pair of stereo images. This is followed by selecting and extracting 215 feature vectors 216. Then, an object detector 220 is applied to the features vectors volume to detect the object. The object detector uses classifiers 230 leaned form training images features 231. After the object is detected, it can be localized, that is the location of the object in the image can be determined. The method can be performed in a processor 250 connected to memory and input/output interfaces by buses as known in the art.

Our invention is based on the realization that depth information available in a depth map is also available in the cost volume, because the depth map is derived from the cost volume.

Our detector 220 that uses the cost volume directly is theoretically capable of matching the performance of any detector based on the depth map. Moreover, the cost volume is a richer representation than the conventional depth map. The depth map only provides a depth for each pixel, while the cost volume provides matching costs for a range of potential depths that each pixel in the stereo images can have, including the true depth. Hence, the detector uses features directly obtained from the cost volume can access more depth information, and achieve better performance.

Figure 3:
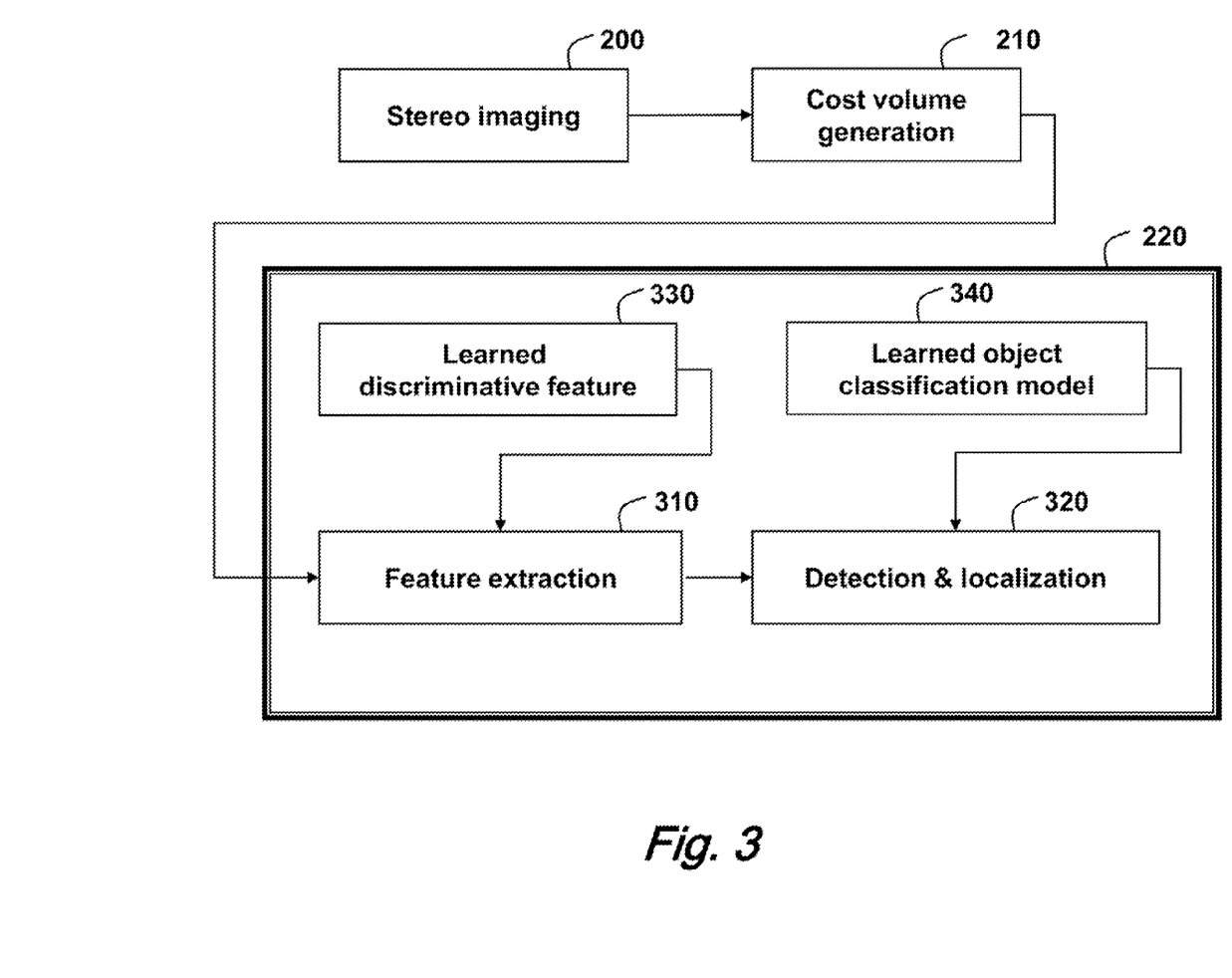
FIG. 3 is a block diagram of an object detection module for the stereo-based object detection system of FIG. 2.

As shown in FIG. 3, one embodiment of our invention includes cost volume generation 210, feature extraction 310, object detection and localization 320, learned discriminative features 330, and a learned object classification model 340. The localization determines where the object is detected.

Figure 4:
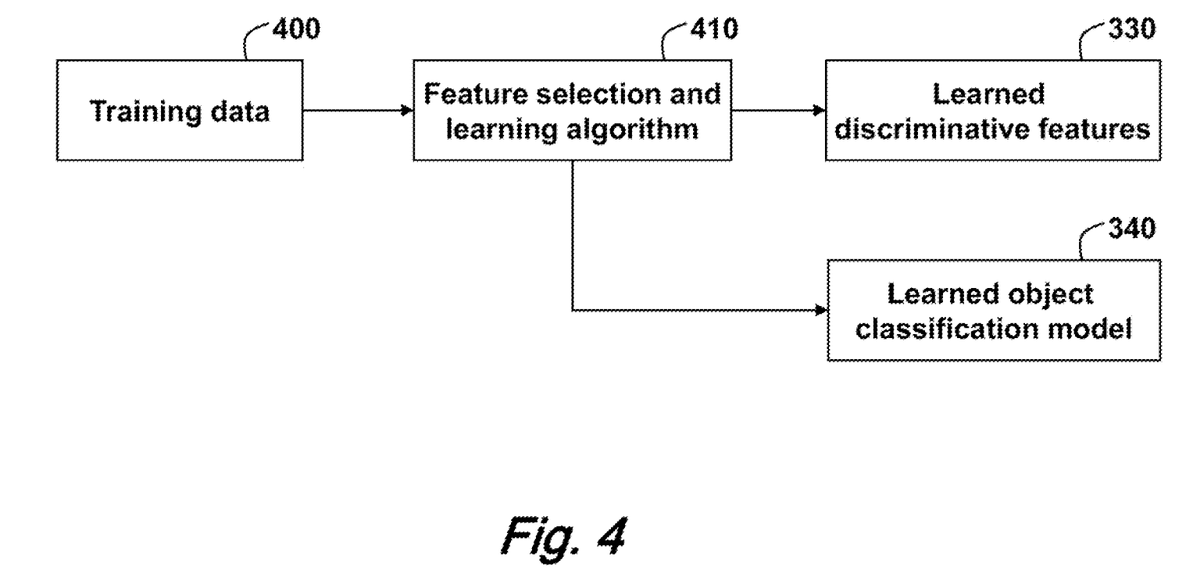
FIG. 4 is a block diagram of a method for learning the stereo-based object detector according to embodiments of the invention.

FIG. 4 shows a machine learning procedure for learning the discriminative features and the learned object classification model. Features are selected and learned 410 from training data 400 comprising pairs of training stereo images.

Cost Volume Generation

Figure 5:
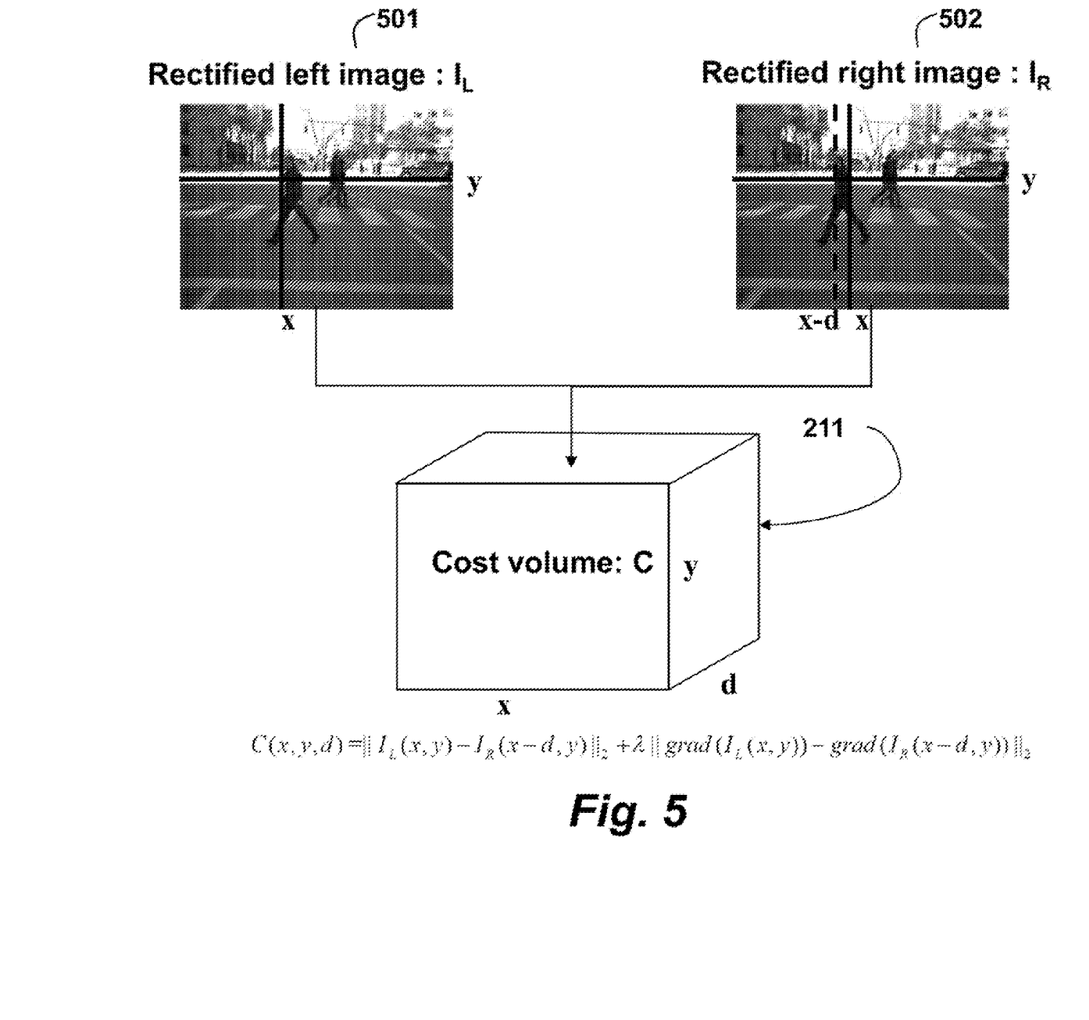
FIG. 5 is a schematic of cost volume determination according to embodiments of the invention.

FIG. 5 shows the generation of the cost volume C 211. The cost volume $C: X \times Y \times D$ is a three-dimension data structure stored in the memory, where X and Y denote the image x and y axes and D denotes a set of disparity values, which are translations between corresponding pixels in the two stereo images $I_L$ 501 and $I_R$ 502. We assume that $I_L$ and $I_R$ are rectified, which means that the images have been transformed such that the lens distortion effects are compensated, and a pixel in a row of one image is mapped to a pixel in the same row of the other image. The cost volume can then be determined by matching pixel appearance in the pair of stereo images $I_L$ and $I_R$.

One way to determine the cost volume apply the mapping given by $$C(x,y,d) = \|I_L(x,y) - I_R(x-d,y)\|_2 + \lambda\|$$

$$\text{grad}(I_L(x,y)) - \text{grad}(I_R(x-d,y))\|_2$$

for any $$(x,y,d) \in X \times Y \times D.$$

where $\|\|_2$ denotes a Euclidean norm and $I_L(x,y)$ refers the pixel color values in the (x,y) location of the $I_L$ image, $I_R(x,y)$ refers the pixel color values in the (x,y) location of the IR image, $\text{grad}(I_L(x,y))$ refers to the gradient in the (x,y) location of the IL image, $\text{grad}(I_R(x-d,y))$ refers to the gradient in the (x,y) location of the IR image, and $\lambda$ is the weight controlling the importance of the gradient information. Note that image smoothing technique can be applied, such as bilateral filtering or guided filtering to enhance the cost volume.

Feature Extraction

Figure 6:
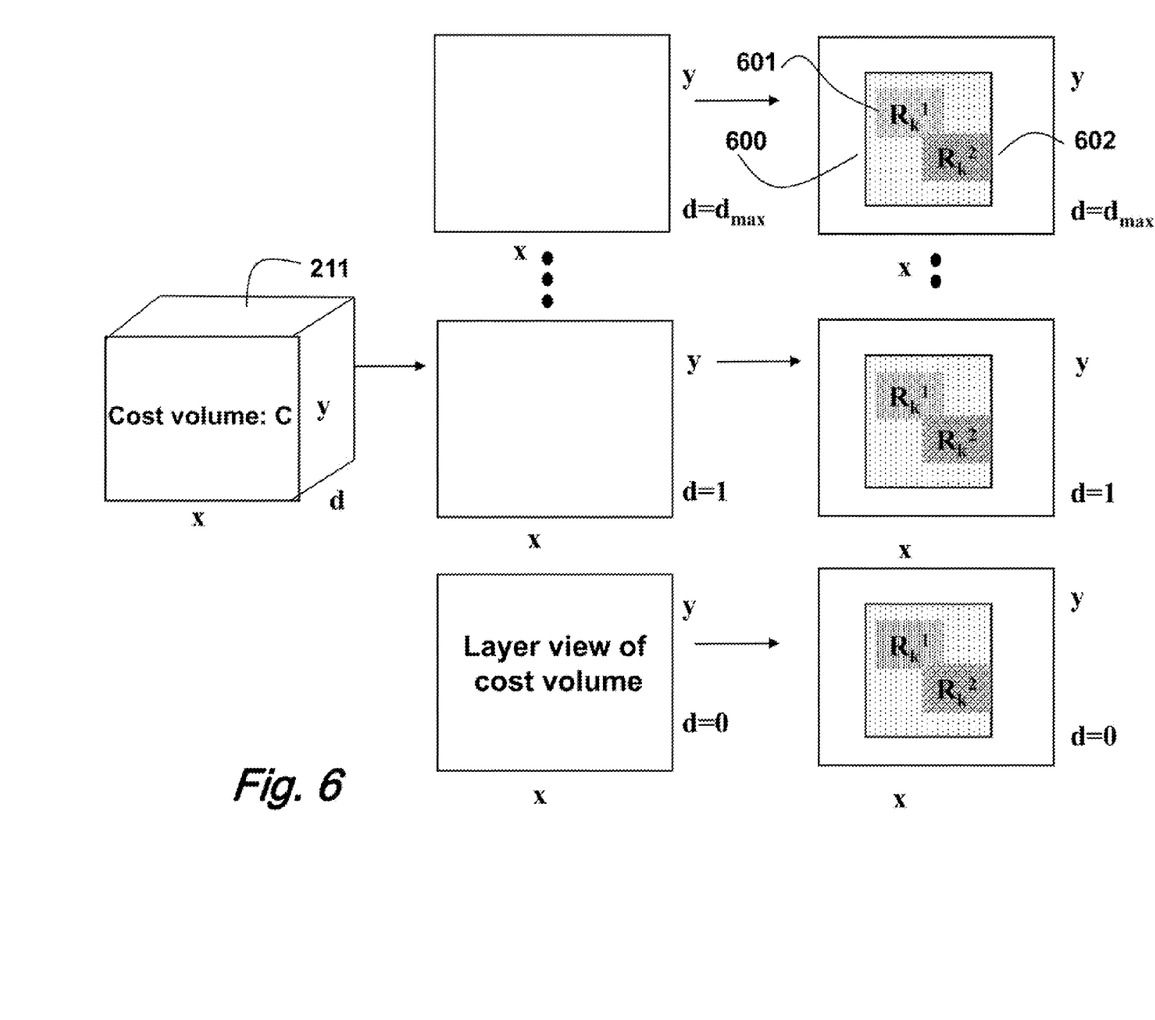
FIG. 6 is a schematic of a learned feature according to embodiments of the invention.

FIG. 6 shows feature selection and extraction 215 of FIG. 2. We extract a K-dimensional feature vector from each sub-image 600 for determining whether or not the object is present in the sub-image. The sub-images can be considered a moving window passed over the image in, e.g., in a raster scan order for each y pixel at multiple scales.

Note, the embodiments only directly uses the cost volume to determine the features. Depth map estimation as in the prior art is not performed.

Each dimension of the feature vector corresponds to a numerical comparison result between a Fig cost disparity values of two, e.g., rectangle, regions $R_k^1$ 601 and $R_k^2$ 602 in the sub-image 600. Let the sub-image be denoted as J and the $k^{th}$ dimension of feature vector be represented as $f_k(J)$. The value of $f_k(J)$ is $$f_k(J) = \begin{cases} 1 & \text{if } d_{min}(R_k^1) > d_{min}(R_k^2) \\ 0 & \text{if } d_{min}(R_k^1) = d_{min}(R_k^2), \\ -1 & \text{otherwise} \end{cases} \quad (1)$$

where $d_{min}(R_k^i)$ represents to the disparity value that has a minimal (min) accumulated cost in the region of $R_k^i$ of the sub-image. That is $$d_{min}(R_k^i) = \arg\min_d \sum_{(x,y) \in R_k^i} C(x,y,d). \quad (2)$$

Note that determining the minimal cost disparity value in the region is relatively simple because the accumulated cost can be obtained efficiently using an integral image technique as known in the art. The locations and size of the regions are learned using a machine learning procedure, which is described below.

Object Detection and Localization

The K-dimensional feature vector associated with the sub-image is passed to an ensemble classifier for determining a detection score. The ensemble classifier includes T decision tree classifiers. Each decision tree classifier takes a small number of dimensions of the K-dimensional feature as input, and classifies the sub-image as positive (containing an object) or negative (not containing an object). A detection score s obtained from the classifier for the sub-image J is given by $$s(J) = \sum_{t=1}^{T} \theta_t \delta_t(J), \quad (3)$$

where $\delta_t$'s are the decision tree classifiers and $\theta_t$'s are the corresponding weights. If the score is greater than a preset threshold, then the system declares a detection in the sub-image.

Figure 7:
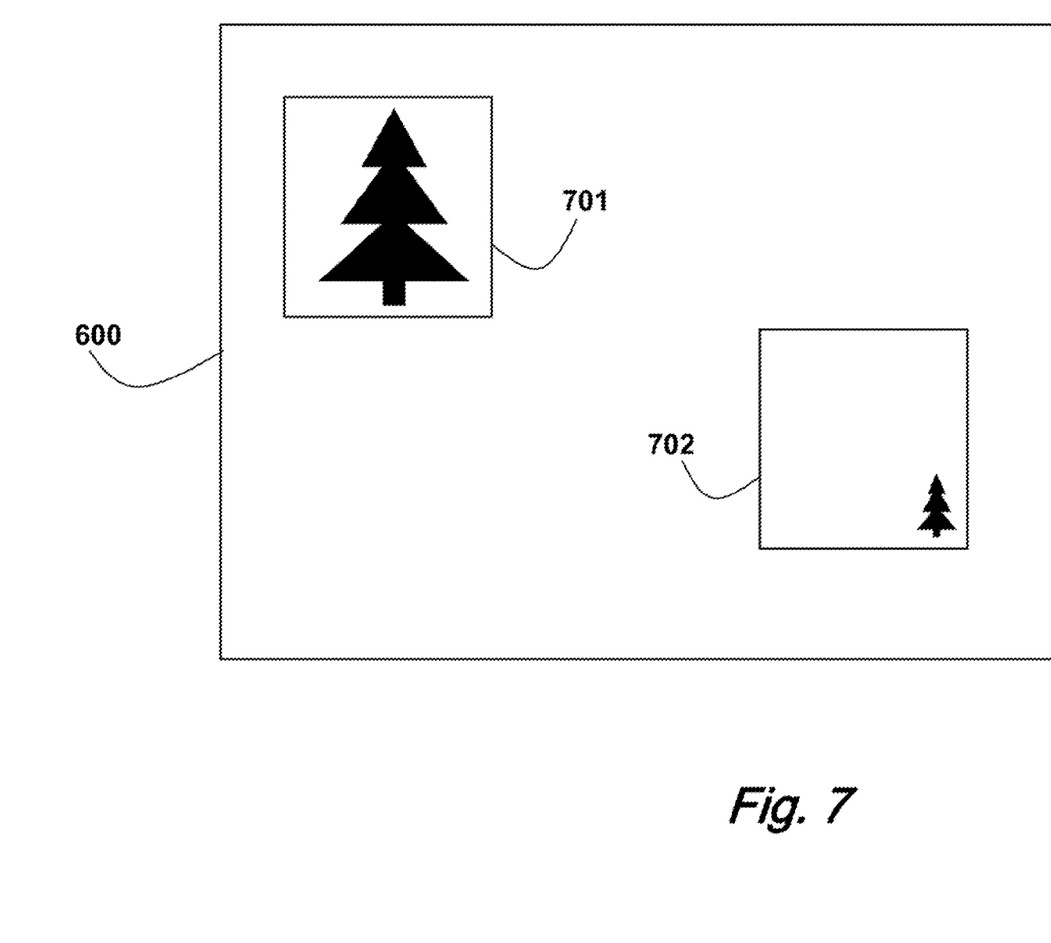
FIG. 7 is a schematic of objects occupying large and small portions of sub-images.

As shown in FIG. 7, the classifier can be trained to give a higher score when the object occupies a larger portion of the sub-image 701 and a lower score when the object only occupies a small portion of the subimage 702, because the larger object provides a better estimate of where the object is located within the image than the smaller object.

Feature Selection and Classifier Learning Procedure

We use a discrete AdaBoost procedure for selecting the region $$\{(R_k^1, R_k^2) | \forall k=1,2,\ldots,K\}, \quad (4)$$

and for learning the decision tree classifier weights $$\{\theta_t | \forall t=1,2,\ldots,T\}. \quad (5)$$

We collect a set of data for a learning task, which includes a set of stereo training images. The sub-images that contain an object is labeled as positive instances, while others are labeled as negative instances. We align the positive and negative sub-images so that their centers coincide. The sub-images are also scaled to have the same height. The aligned and scaled sub-images are denoted as $$D = \{(J_i, l_i), i=1,2,\ldots,V\}, \quad (6)$$

where $J_i$ denotes the $i^{th}$ sub-image, $l_i$ is the label, and V is the total number of sub-images.

We sample a set of N regins as the feature pools $\{R_i, i=1, 2, \ldots, N\}$, which have different locations and sizes and are covered by the aligned sub-images. We randomly pair two regions and compare their disparity values of the minimal cost. This is performed K times to construct a K-dimensional feature vector.

We use the discrete AdaBoost procedure to learn T decision tree classifiers and their weights. The procedure starts with assigning uniform weights to the training samples. A decision tree is then learned based on the current training sample weights. The weights of incorrectly classified samples are increased so that the weights have more impact during the next round of decision tree classifier learning. We assign the weight to the decision tree classifier based on the weighted error rate. This process is repeated T times to construct an ensemble classifier of T decision tree classifiers. A pseudo code of the procedure is described below.

Input: Feature vectors and class labels $D = \{(f(J_i), l_i), i=1, 2, \ldots, V\}$ Output: Ensemble classifiers $\Sigma_{t=1}^{T} \theta_t \delta_t(J)$ Start with uniform weights $$w_i = \frac{1}{V}, i = 1, 2, \ldots, V$$

For t=1, 2, ..., T
1. Learn a decision tree classifier $\delta_t(J) \in \{-1,1\}$ using weights $w_i$'s;
2. Determine error rate $\epsilon = \Sigma_i w_i I(\delta_t(J_i) \neq l_i)$;
3. Determine decision tree classifier weight $$\theta_t = \log \frac{1-\epsilon}{\epsilon};$$

4. Set $w_i \leftarrow w_i \exp(\theta_t I(\delta_t(J_i) \neq l_i)$ for i=1,2, ..., V; and
5. Normalize the sample weights $$w_i \leftarrow \frac{w_i}{\sum_i w_i}.$$

Function $\delta t$, which is used in steps 2 and 4, represents the indicator function, which returns one if the statement in the parenthesis is true and zero otherwise.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for detecting an object in a pair of stereo images acquired of a scene, where each stereo image include pixels, comprising the steps of:
   generating a cost volume from the pair of stereo images, wherein the cost volume includes matching costs for a range of disparity values, for each pixel, between the stereo images in the pair;
   determining feature vectors from sub-images in the cost volume using a feature function of the disparity values with a minimal accumulated cost within regions inside the sub-images; and
   applying a classifier to the feature vectors to detect whether the sub-images includes the object, wherein the steps are performed in a processor.
2. The method of claim 1, further comprising:
   localizing the object within the stereo images.
3. The method of claim 1, wherein the classifier is learned from pairs of training stereo images.
4. The method of claim 1, further comprising:
   rectifying the pair of stereo images.
5. The method of claim 1, further comprising:
   smoothing the pair of stereo images.
6. The method of claim 1, wherein the generating further comprises:
   matching colors and gradients of the pixels in the pair of stereo images using a Euclidian norm.
7. The method of claim 1, wherein the feature function is $$f_k(J) = \begin{cases} 1 & \text{if } d_{min}(R_k^1) > d_{min}(R_k^2) \\ 0 & \text{if } d_{min}(R_k^1) = d_{min}(R_k^2), \\ -1 & \text{otherwise.} \end{cases} \quad (1)$$

where J represents the sub-image, k represents a dimension of the feature vectors, min represents a function that returns a minimum, and $d_{min}(R_{ki})$ represents the disparity value that has a minimal accumulated cost in rectangle area of $R_k^i$ in the sub-image, wherein i indexes rectangular regions.

8. The method of claim 7, wherein $$d_{min}(R_k^i) = \arg\min_d \sum_{(x,y) \in R_k^i} C(x, y, d).$$

where C(x, y, d) represent the cost volume.

9. The method of claim 1, wherein the classifier is an ensemble classifier including T decision tree classifiers.
10. The method of claim 9, wherein the classifier provides a detection score s for sub-image J is $$s(J) = \sum_{t=1}^{T} \theta_t \delta_t(J),$$

where $\delta_t$'s are the decision tree classifiers and $\theta_t$'s are corresponding weights.

* * * * *